(12) United States Patent
Tanaami et al.

(10) Patent No.: US 12,489,117 B2
(45) Date of Patent: Dec. 2, 2025

(54) NONAQUEOUS ELECTROLYTE SECONDARY BATTERY

(71) Applicant: HONDA MOTOR CO., LTD., Tokyo (JP)

(72) Inventors: Kiyoshi Tanaami, Saitama (JP); Toshimitsu Tanaka, Saitama (JP); Yuji Isogai, Saitama (JP); Shintaro Aoyagi, Saitama (JP); Makiko Takahashi, Saitama (JP); Tomohiro Kinoshita, Saitama (JP); Takashi Mukai, Osaka (JP); Yuta Ikeuchi, Osaka (JP); Taichi Sakamoto, Osaka (JP); Naoto Yamashita, Osaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 733 days.

(21) Appl. No.: 17/578,461

(22) Filed: Jan. 19, 2022

(65) Prior Publication Data

US 2022/0231299 A1    Jul. 21, 2022

(30) Foreign Application Priority Data

Jan. 21, 2021    (JP) .................................. 2021-008139

(51) Int. Cl.
| | |
|---|---|
| *H01M 4/134* | (2010.01) |
| *H01M 4/36* | (2006.01) |
| *H01M 4/38* | (2006.01) |
| *H01M 4/62* | (2006.01) |
| *H01M 4/66* | (2006.01) |
| *H01M 4/80* | (2006.01) |

(52) U.S. Cl.
CPC ........... *H01M 4/628* (2013.01); *H01M 4/134* (2013.01); *H01M 4/366* (2013.01); *H01M 4/386* (2013.01);
(Continued)

(58) Field of Classification Search
CPC .............................. H01M 4/134; H01M 4/366
See application file for complete search history.

(56) References Cited

U.S. PATENT DOCUMENTS

| | | |
|---|---|---|
| 2011/0003199 A1 | 1/2011 | Yamamura et al. |
| 2017/0125806 A1 | 5/2017 | Wang et al. |

(Continued)

FOREIGN PATENT DOCUMENTS

| | | |
|---|---|---|
| CN | 108475787 A | 8/2018 |
| CN | 109698365 A | 4/2019 |

(Continued)

OTHER PUBLICATIONS

Machine translation of CN-112201787-A from PE2E (Year: 2021).*
(Continued)

*Primary Examiner* — Nicholas A Smith
*Assistant Examiner* — Zackary Richard Cochenour
(74) *Attorney, Agent, or Firm* — CKC & Partners Co., LLC

(57) ABSTRACT

To provide a nonaqueous electrolyte secondary battery which enables to suppress durability deterioration, improve energy density, and further suppress a decrease in the function of the nonaqueous electrolyte secondary battery cell. A nonaqueous electrolyte secondary battery, comprising: a positive electrode; and a negative electrode, wherein the negative electrode has: a current collector comprising a porous metal body; and a negative electrode material disposed in pores of the porous metal body, the negative electrode material comprises a negative electrode active material comprising a silicon-based material, a skeleton-forming agent comprising a silicate having a siloxane bond, a conductive auxiliary, and a binder, and a content of the skeleton-forming agent in an outside in a surface direction of the negative electrode is higher than a content of the
(Continued)

skeleton-forming agent in an inside in the surface direction of the negative electrode.

5 Claims, 5 Drawing Sheets

(51) Int. Cl.
    *H01M 10/0525*     (2010.01)
    *H01M 4/02*     (2006.01)

(52) U.S. Cl.
    CPC .............. *H01M 4/62* (2013.01); *H01M 4/661* (2013.01); *H01M 4/808* (2013.01); *H01M 10/0525* (2013.01); *H01M 2004/027* (2013.01)

(56) References Cited

U.S. PATENT DOCUMENTS

| | | | | |
|---|---|---|---|---|
| 2018/0294475 | A1* | 10/2018 | Zhamu | ................ H01M 10/054 |
| 2019/0326601 | A1* | 10/2019 | Sakamoto | ............... H01M 4/62 |
| 2020/0020928 | A1 | 1/2020 | Maeda et al. | |
| 2020/0365883 | A1* | 11/2020 | Lee | ...................... H01M 4/386 |
| 2020/0373565 | A1* | 11/2020 | Yawata | ............... H01M 50/474 |

FOREIGN PATENT DOCUMENTS

| | | | |
|---|---|---|---|
| CN | 110383568 | A | 10/2019 |
| CN | 111952658 | A | 11/2020 |
| CN | 112201787 | A * | 1/2021 |
| EP | 3937279 | A1 | 1/2022 |
| JP | 6149147 | B1 | 6/2017 |
| JP | 2018085276 | A | 5/2018 |
| JP | 6369818 | B2 | 8/2018 |
| JP | 2018170243 | A | 11/2018 |

OTHER PUBLICATIONS

Machine translation of CN109698365A from espacenet (Year: 2019).*
Office Action issued Oct. 24, 2024 in the CN Patent Application No. 202210055357.4.

* cited by examiner

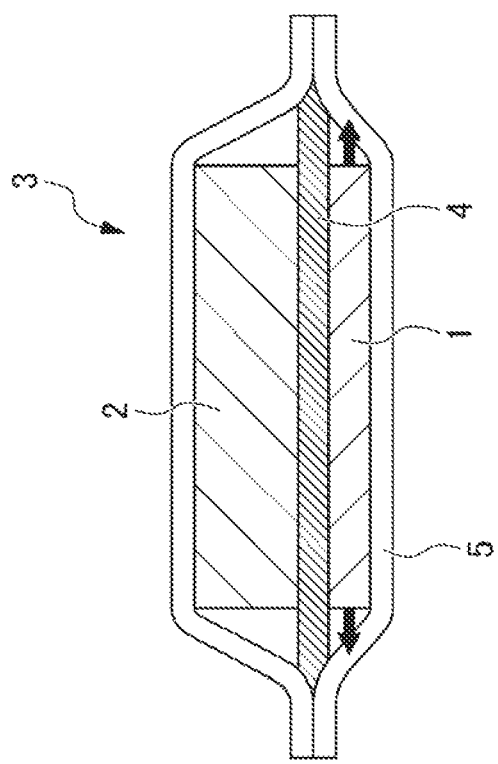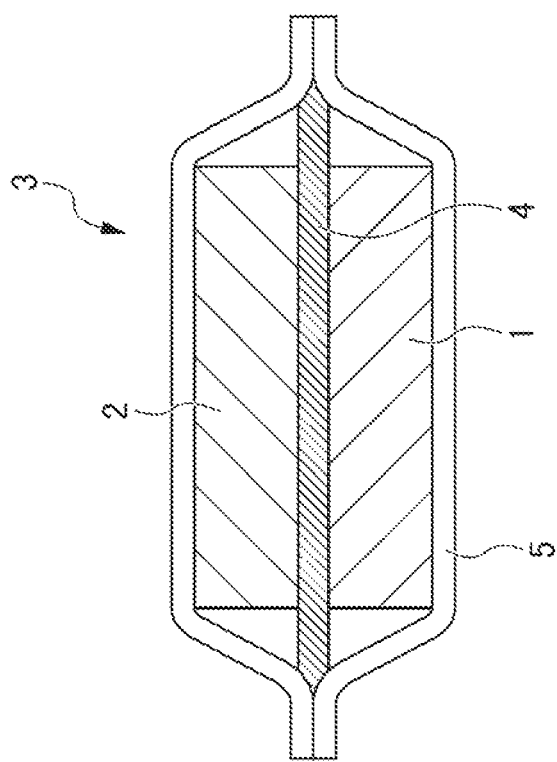
FIG. 1

NONAQUEOUS ELECTROLYTE SECONDARY BATTERY

This application is based on and claims the benefit of priority from Japanese Patent Application No. 2021-008139, filed on 21 Jan. 2021, the content of which is incorporated herein by reference.

BACKGROUND OF THE INVENTION

Field of the Invention

The present invention relates to a nonaqueous electrolyte secondary battery.

Related Art

In recent years, use of nonaqueous electrolyte secondary batteries, such as lithium ion secondary batteries, for cars and the like is increasing as they are small and light-weight and enable to obtain high power. A nonaqueous electrolyte secondary battery is a battery system using an electrolyte not containing water as the main ingredient for an electrolyte, and is a general term for chargeable and dischargeable power storage devices. For example, lithium ion batteries, lithium polymer batteries, lithium all-solid batteries, lithium-air batteries, lithium sulfur batteries, sodium-ion batteries, potassium-ion batteries, multivalent ion batteries, fluoride batteries, sodium sulfur batteries, and the like are known. This nonaqueous electrolyte secondary battery mainly comprises a positive electrode, a negative electrode, and an electrolyte. When the electrolyte has fluidity, the nonaqueous electrolyte secondary battery is configured by further placing a separator between the positive electrode and the negative electrode.

For example, a technique for making a skeleton-forming agent containing a silicate having siloxane bonds exist at least on the surface of an active material and making the skeleton-forming agent permeate the inside from the surface to improve a battery life is disclosed (for example, refer to Patent Document 1). According to this technique, a firm skeleton can be formed in the active material, and thus it is supposed that the battery life can be improved. A technique in which the skeleton-forming agent is applied to a negative electrode containing a silicon (Si)-based active material is also disclosed (for example, refer to Patent Document 2).
Patent Document 1: Japanese Patent No. 6369818
Patent Document 2: Japanese Patent No. 6149147

SUMMARY OF THE INVENTION

Improvement in energy density is required for the nonaqueous electrolyte secondary battery. It is considered that an increase in the film thickness of a negative electrode or the densification of a negative electrode active material is effective for improvement in energy density. However, in conventional technology, the thickness of a negative electrode has a limit when the negative electrode is manufactured. A practical thickness of a film obtained by applying an electrode mixture layer to a conventional current collecting foil is specifically less than 100 μm. In the case of a film thickness of 100 μm or more, problems such as uneven coating, cracks, and exfoliation occur, and it is difficult to manufacture a high-precision negative electrode.

There is a limit to the amount of a negative electrode active material per unit area from the viewpoint of durability due to the balance between the binding capacity of a binder and the expansion and contraction of a negative electrode active material. The limit to the active material capacity of a negative electrode per unit area is specifically around 4 mAh/cm$^2$ (film thickness: 50 μm); with the active material capacity of equal to or more than that, enough cycle performance cannot be maintained. Meanwhile, if the active material capacity is less than 4 mAh/cm$^2$, the energy density cannot be expected to be improved.

It is considered applying a porous metal body to the current collector of the negative electrode of a nonaqueous electrolyte secondary battery and filling the porous metal body with an electrode mixture to solve the above-mentioned problem. When a current collector comprising a porous metal body and a negative electrode active material comprising a silicon-based material are applied to a negative electrode in a nonaqueous electrolyte secondary battery, the current collector comprising a porous metal body on the negative electrode side follows the expansion and contraction of a negative electrode active material comprising a silicon-based material at the time of charge and discharge, and the whole negative electrode therefore expands or contracts. It has been found that the expansion or contraction of the whole negative electrode may cause unintended deformation of the negative electrode or difference in positional relationship between a negative electrode and a positive electrode in a nonaqueous electrolyte secondary battery cell, and the function of a nonaqueous electrolyte secondary battery cell decreases also due thereto.

Accordingly, a negative electrode for nonaqueous electrolyte secondary batteries and a positive electrode for nonaqueous electrolyte secondary batteries which enable to suppress durability deterioration, improve energy density, and further suppress a decrease in the function of a nonaqueous electrolyte secondary battery cell, and a nonaqueous electrolyte secondary battery comprising these have been desired.

The present invention has been completed in view of the above, and an object of the present invention is to provide a nonaqueous electrolyte secondary battery which enables to suppress durability deterioration, improve energy density, and further suppress a decrease in the function of the nonaqueous electrolyte secondary battery cell.

(1) The present invention provides a nonaqueous electrolyte secondary battery, comprising: a positive electrode; and a negative electrode, the negative electrode comprising: a current collector comprising a porous metal body; and a negative electrode material disposed in pores of the porous current collector, the negative electrode material comprising: a negative electrode active material comprising a silicon-based material; a skeleton-forming agent comprising a silicate having a siloxane bond; a conductive auxiliary; and a binder, the negative electrode having an outer portion and an inner portion in its in-plane direction, the outer portion having a skeleton-forming agent content higher than that of the inner portion.

(2) The nonaqueous electrolyte secondary battery of (1), wherein the positive electrode has a buffer layer which is more easily deformable by external force as compared with other regions of the positive electrode in a region opposed to the negative electrode is also provided.

(3) In the nonaqueous electrolyte secondary battery of (2), the buffer layer may comprise at least one of a carbon-based material and an organic conductive polymer.

(4) In the nonaqueous electrolyte secondary battery of any one of (1) to (3), the negative electrode may have a non-deforming layer which is less easily deformable by external force as compared with other regions of the negative electrode in a region opposed to the positive electrode.

(5) In the nonaqueous electrolyte secondary battery of (4), the non-deforming layer may be an active material layer comprising at least one of a carbon-based material and lithium titanate.

(6) In the nonaqueous electrolyte secondary battery of any one of (1) to (5), the skeleton-forming agent may comprise a silicate represented by the following general formula (1):

[Chem. 1]

$$A_2O \cdot nSiO_2 \quad \text{formula (1)}$$

wherein A represents an alkali metal.

(7) In the nonaqueous electrolyte secondary battery of any one of (1) to (6), the porous metal body may be a foamed metal body.

According to the present invention, a nonaqueous electrolyte secondary battery which enables to suppress durability deterioration and improve energy density can be provided.

BRIEF DESCRIPTION OF THE DRAWINGS

FIG. 1 is a figure showing the sections of a conventional nonaqueous electrolyte secondary battery schematically;

DETAILED DESCRIPTION OF THE INVENTION

Hereinafter, a first embodiment of a nonaqueous electrolyte secondary battery of the present invention will be described in detail with reference to the drawings.

First Embodiment

[Negative Electrode]

Figure 2:
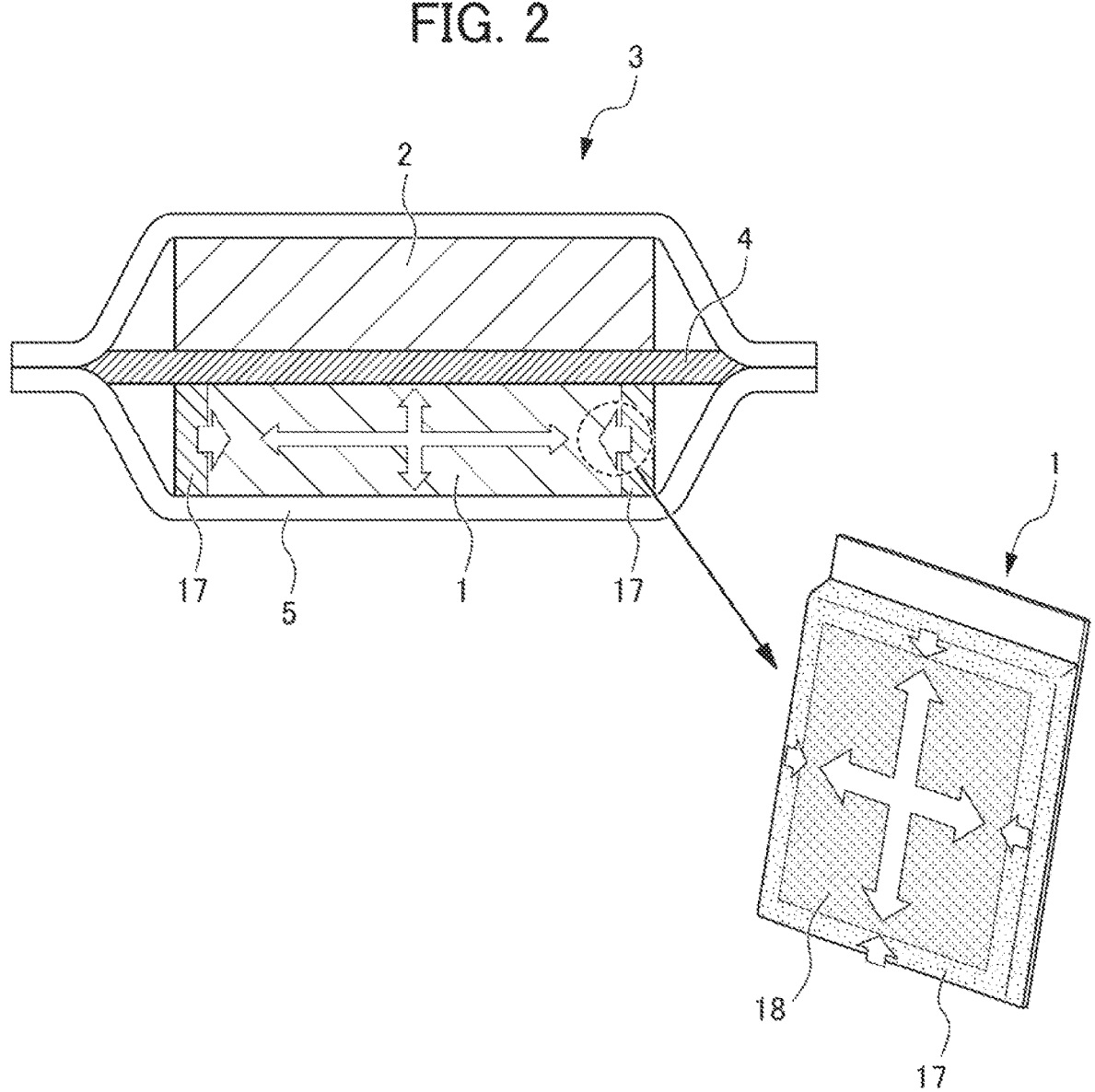
FIG. 2 is a sectional view showing the configuration of a nonaqueous electrolyte secondary battery according to a first embodiment of the present invention schematically.
Figure 5:
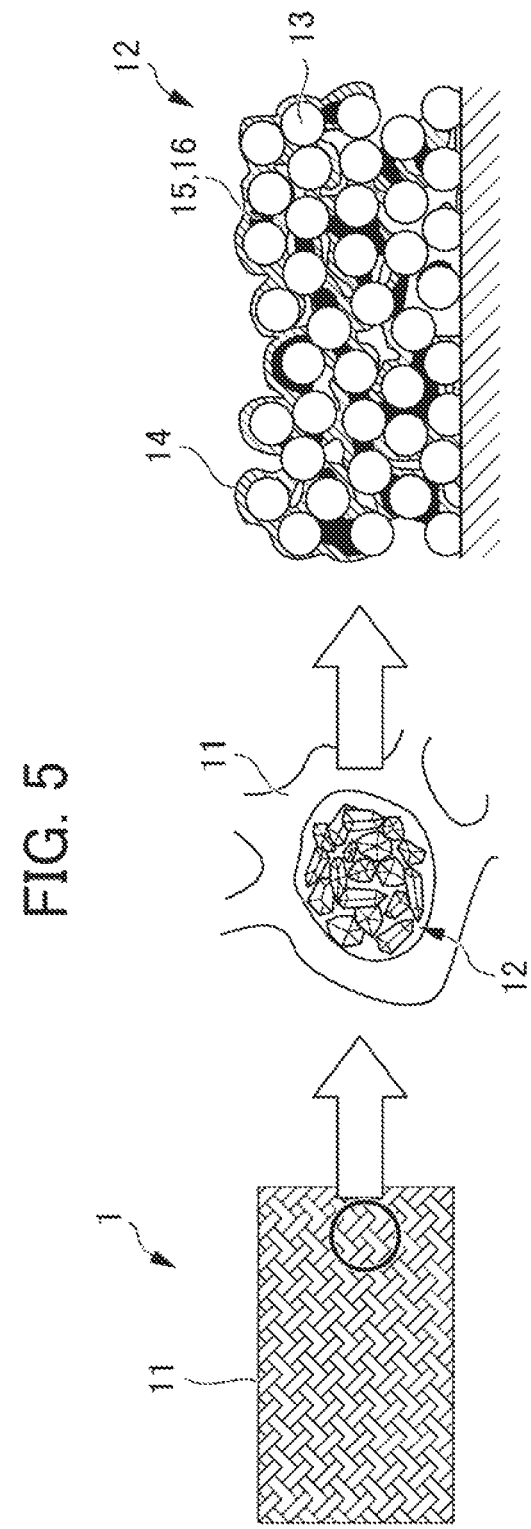
FIG. 5 is a figure showing the configuration in a negative electrode of a nonaqueous electrolyte secondary battery of the present invention.

FIG. 2 is a figure showing the configuration of a nonaqueous electrolyte secondary battery according to the present embodiment schematically. FIG. 5 is a figure showing the configuration in a negative electrode of the nonaqueous electrolyte secondary battery of the present invention. A negative electrode 1 of the nonaqueous electrolyte secondary battery according to the present embodiment has a current collector 11 comprising a porous metal body and a negative electrode material 12 disposed in pores of the porous metal body. The negative electrode material 12 contains a negative electrode active material 13 comprising a silicon-based material, a skeleton-forming agent 14 containing a silicate having siloxane bonds, a conductive auxiliary 15, and a binder 16. The content of the skeleton-forming agent in an outer portion 17 of the negative electrode 1 in its in-plane direction is higher than the content of the skeleton-forming agent in an outer portion 18 of the negative electrode 1 in its in-plane direction. For example, a lithium ion secondary battery which enables to suppress durability deterioration, improve energy density, and further suppress a decrease in the function of the nonaqueous electrolyte secondary battery cell can be provided by applying the present embodiment to a lithium ion secondary battery. An example in which the present embodiment is applied to a lithium ion secondary battery will be described in detail hereinafter. As long as the example does not deviate from the gist of the present invention, various types of addition, modification, or deletion is however possible.

As the current collector 11, a current collector comprising a porous metal body is used. Meshes, woven fabrics, non-woven fabrics, embossed bodies, punched bodies, expanded bodies, foamed bodies, and the like are illustrated, and a foamed metal body is preferably used. Especially, the foamed metal body which is a three-dimensional mesh structure having continuous pores is preferably used, for example, CELMET® (manufactured by Sumitomo Electric Industries, Ltd.) or the like can be used.

As long as the material of the porous metal body is a material which has electron conductivity and enables to energize the retained electrode material, the material of the porous metal body is not particularly limited. As the material of the porous metal body, a conductive metal such as Al, Al alloy, Ni, Ni—Cr alloy, Fe, Cu, Ti, Cr, Au, Mo, W, Ta, Pt, Ru, or Rh, a conductive alloy containing two or more of these conductive metals (stainless steel (SUS304, SUS316, SUS316L, YUS270, or the like)), or the like can be used. When a metal other than the above-mentioned conductive metal or conductive alloy is used, for example, the metal may have a multilayer structure of different type metals in which Fe is covered with Cu or Ni. Especially, Ni or Ni alloy is preferably used due to excellent electron conductivity and reduction resistance.

The thickness of the porous metal body is preferably 10 μm or more, and more preferably 50 μm or more. The thickness of the porous metal body is preferably 1 mm or less, and more preferably 500 μm or less.

The average pore size of the porous metal body is preferably 500 μm or less. With the average pore size of the porous metal body in this range, the distance between the negative electrode active material 13 filled into the porous metal body and the metal skeleton is stabilized, the electron conductivity is improved, and an increase in the internal resistance of the battery is suppressed. Even though the volume changes with charge and discharge, the falling of the electrode mixture can be suppressed.

The specific surface area of the porous metal body is preferably 200 to 10000 $m^2/m^3$. This is 2 to 10 times the specific surface area of the conventionally common current collecting foil. With the specific surface area of the porous metal body in this range, the contact properties between the electrode mixture and the current collector 11 are improved, and an increase in the internal resistance of the battery is suppressed. A more preferable specific surface area is 500 to 7000 $m^2/m^3$.

The porosity of the porous metal body is preferably 90 to 99%. With the porosity of the porous metal body in this range, the filling amount of the electrode mixture can be increased, and the energy density of the battery is improved.

Specifically, when the porosity exceeds 99%, the mechanical strength of the porous metal body decreases markedly, and the porous metal body is easily damaged due to the volume change of the electrode associated with charge and discharge. Conversely, in the case of the porosity of less than 90%, not only the filling amount of the electrode mixture, but also the ion conductivity of the electrode decreases and enough input and output characteristics are difficult to obtain. A more preferable porosity is 93 to 98% from these viewpoints.

The electrode coating weight of the porous metal body is preferably 1 to 100 mg/cm². With the electrode coating weight of the porous metal body in this range, the active material capacity can be fully exhibited, and the capacity as designed can be shown as the electrode. A more preferable electrode coating weight is 5 to 60 mg/cm².

A negative electrode active material 13 which can intercalate and deintercalate lithium ions reversibly is used, and a negative electrode active material 13 comprising a silicon-based material, which has high capacity, is specifically used. The silicon-based material may be a silicon simple substance, silicon alloy, silicon oxide, silicon compounds, and the like. Here, the silicon simple substance refers to crystalline or amorphous silicon with a purity of 95% by mass or more. The silicon alloy means a Si-M alloy comprising silicon and another transition element, M. Examples of M include Al, Mg, La, Ag, Sn, Ti, Y, Cr, Ni, Zr, V, Nb, and Mo. The silicon alloy may be an all solid solution type alloy, a eutectic alloy, a hypoeutectic alloy, a hypereutectic alloy, or a peritectic type alloy. The silicon oxide means an oxide of silicon or a complex comprising the silicon simple substance and $SiO_2$. The element ratio of O to Si may be 1.7 or less: 1. The silicon compound is a substance in which silicon and two or more other elements are chemically bound. Since the below-mentioned interface layer can be formed satisfactorily, among these, the silicon simple substance is preferable. Alternatively, a substance in which a carbon-based material is mixed or compounded with a silicon-based material can also be used.

The shape of the silicon-based material is not particularly limited. The silicon-based material may be spherical powder, elliptic powder, hexahedral powder, belt-shaped powder, fibrous powder, flaky powder, doughnut-shaped powder, or hollow powder. These may be single particles or granulated bodies.

The expansion coefficient of the negative electrode active material 13 comprising a silicon-based material due to charge and discharge is 10% or more. That is, although the negative electrode active material 13 expands and contracts greatly at the time of charge and discharge, durability deterioration due to such expansion and contraction can be suppressed using the below-mentioned skeleton-forming agent 14.

In view of excellent cycle characteristics of the electrode and high input and output characteristics to be obtained, the particle size of the silicon-based material is preferably 0.01 μm to 10 μm.

The negative electrode active material 13 may be configured by incorporating a carbon-based material (graphite, hard carbon, soft carbon, or the like) besides the above-mentioned silicon-based material.

As the skeleton-forming agent 14, a skeleton-forming agent 14 containing a silicate having siloxane bonds is used. It is more specifically preferable that the skeleton-forming agent 14 contain a silicate represented by the following general formula (1).

[Chem. 2]

$$A_2O \cdot nSiO_2 \qquad \text{formula (1)}$$

In the above general formula (1), A represents an alkali metal. Especially, preferable A is at least any one of lithium (Li), sodium (Na), and potassium (K). A lithium ion secondary battery which has high strength and excellent heat resistance and cycle life is obtained using such an alkali metal salt of silicic acid having siloxane bonds as the skeleton-forming agent.

In the above general formula (1), n is preferably 1.6 or more and 3.9 or less. With n in this range, appropriate viscosity is obtained in the case of mixing the skeleton-forming agent 14 and water to prepare skeleton-forming agent liquid. As mentioned below, the skeleton-forming agent 14 easily permeates the negative electrode material 12 at the time of application to the negative electrode containing silicon as the negative electrode active material 13. Thus, a lithium ion secondary battery which has high strength and excellent heat resistance and cycle life is obtained more certainly. n is more preferably 2.0 or more and 3.5 or less.

The above-mentioned silicate is preferably amorphous. An amorphous silicate is in disordered molecular alignment, and therefore does not break in a specific direction unlike a crystal. Accordingly, the cycle life characteristics are improved using an amorphous silicate as the skeleton-forming agent 14.

For example, the skeleton-forming agent 14 permeates between negative electrode active materials 13 by applying the above-mentioned skeleton-forming agent liquid to the negative electrode containing silicon as the negative electrode active material 13. Then, it is presumed that siloxane bonds (—Si—O—Si—) is formed by fusing silicon constituting the negative electrode active material 13 and the above-mentioned silicate constituting the skeleton-forming agent 14, and, for example, subjecting the hydrolyzed silicate to dehydration reaction (condensation reaction of silanol groups) by heating. That is, in the negative electrode 1 for lithium ion secondary batteries of the present embodiment, the interface layer comprising an inorganic substance is formed on the interface between the negative electrode active material 13 and the skeleton-forming agent 14, and silicon derived from siloxane bonds and an alkali metal generated by the hydrolysis of the silicate are contained in this interface layer. It is presumed that the negative electrode active material 13 and the skeleton-forming agent 14 are firmly bound due to the presence of this interface layer, so that the excellent cycle life characteristics are obtained.

In the present embodiment, it is preferable that the ratio of alkali metal atoms to all the constituent atoms in the interface layer be higher than the ratio of alkali metal atoms to all the constituent atoms in the skeleton-forming agent 14. It is more specifically preferable that the ratio of the alkali metal atoms to all the constituent atoms in the interface layer be 5 times or more the ratio of the alkali metal atoms to all the constituent atoms in the skeleton-forming agent 14. Then, the bond between the negative electrode active material 13 and the skeleton-forming agent 14 becomes firmer. Peeling, and wrinkles and cracks of the current collectors 11 due to the expansion and contraction of the negative electrode active material 13 at the time of charge and discharge are further suppressed. Therefore, the cycle life is further improved.

The thickness of the above-mentioned interface layer is preferably 3 to 30 nm. With the thickness of the interface layer in this range, the bond between the negative electrode active material 13 and the skeleton-forming agent 14 becomes firmer. Peeling, and wrinkles and cracks of the current collectors 11 due to the expansion and contraction of the negative electrode active material 13 at the time of charge and discharge are further suppressed, and the cycle life is further improved.

The skeleton-forming agent 14 of the present embodiment may contain a surfactant. This leads to improved lyophilicity of the skeleton-forming agent 14 and permeability to the negative electrode material 12, and the skeleton-forming agent 14 permeates the negative electrode material 12 uniformly. Thus, a uniform skeleton is formed between the negative electrode active materials 13 in the negative electrode material 12, and the cycle life characteristics are further improved.

In the negative electrode 1 of the present embodiment, the skeleton-forming agent 14 is disposed at least on the interface with the current collector 11 in the negative electrode material 12. More specifically, the skeleton-forming agent 14 exists dispersively between the negative electrode active materials 13 not only on the interface between the current collector 11 and the negative electrode material 12 but also in the whole negative electrode material 12. In the present embodiment, the content (density) of the skeleton-forming agent in the outer portion 17 of the negative electrode 1 in the in-plane direction is higher than the content of the skeleton-forming agent in the inner portion 18 of the negative electrode 1 in its in-plane direction. The expansion and contraction which occurs from the inside in the in-plane direction of the negative electrode toward the outside in the in-plane direction of the negative electrode at the time of the charge and discharge of the nonaqueous electrolyte secondary battery, that is, unintended deformation or positional difference of the negative electrode can be suppressed thereby. Therefore, a decrease in the function of the nonaqueous electrolyte secondary battery cell can be suppressed. The outer portion 17 of the negative electrode 1 in the in-plane direction refers to a region extending over a length of up to 10% of each of the length and width of the electrode from its periphery toward inside. The inner portion 18 in the in-plane direction refers to a region other than the outer portion 17.

The content (density) of the skeleton-forming agent 14 in the negative electrode material 12 is preferably 2.0 to 5.0 mg/cm$^2$ in the outer portion 17 of the negative electrode 1 in the in-plane direction. The content (density) of the skeleton-forming agent 14 in the negative electrode material 12 is preferably 1.0 to 2.0 mg/cm$^2$ in the inner portion 18 of the negative electrode 1 in the in-plane direction. With the contents of the skeleton-forming agent 14 to the negative electrode material 12 in these ranges, the effect of the use of the above-mentioned skeleton-forming agent 14 is exhibited more certainly. The content of the skeleton-forming agent are more preferably 2.0 mg/cm$^2$ in the outer portion 17 in the in-plane direction, and 1.0 mg/cm$^2$ in the inner portion 18 in the in-plane direction.

The content of the skeleton-forming agent 14 in the whole negative electrode is preferably 3.0 to 40.0% by mass based on 100% by mass in total of the solid contents of the negative electrode active material 13, the skeleton-forming agent 14, the conductive auxiliary 15, and the binder 16. With the content of the skeleton-forming agent 14 in the whole negative electrode in this range, the effect of the use of the above-mentioned skeleton-forming agent 14 is demonstrated more certainly. The function of the skeleton-forming agent 14 is more fully obtained by adjusting the content of the skeleton-forming agent 14 in the negative electrode material 12 to 3.0% by mass or more. A decrease in energy density can be further prevented by adjusting the content of the skeleton-forming agent 14 to 40.0% by mass or less. The content of the skeleton-forming agent 14 in the whole negative electrode is more preferably 5.0 to 30.0% by mass.

The negative electrode 1 for lithium ion secondary batteries according to the present embodiment contains the conductive auxiliary 15. As long as the conductive auxiliary 15 has electron conductivity, the conductive auxiliary 15 is not particularly limited. As the conductive auxiliary 15, a metal, a carbon material, a conductive polymer, conductive glass, or the like can be used Specific examples include acetylene black (AB), ketjen black (KB), furnace black (FB), thermal black, lamp black, channel black, roller black, disk black, carbon black (CB), carbon fiber (for example, vapor phase growth carbon fiber VGCF®), carbon nanotubes (CNT), carbon nanohorns, graphite, graphene, glassy carbon, and amorphous carbon. One or more of these can be used.

The content of the conductive auxiliary 15 is preferably 0 to 20.0% by mass based on 100% by mass in total of the contents of the negative electrode active material 13, the conductive auxiliary 15, and the binder 16 contained in the negative electrode material 12, the. With the content of conductive auxiliary 15 in this range, the conductivity can be improved without reduction in the negative electrode capacity density, and openings which enables to retain enough liquid of the skeleton-forming agent 14 can be formed in the negative electrode material 12. The content of the conductive auxiliary 15 is more preferably 8.8 to 25.0% by mass.

The conductive auxiliary 15 of the present embodiment preferably has a bulk density of 0.04 to 0.25 mg/cm$^3$. With the bulk density of the conductive auxiliary 15 in this range, the above-mentioned skeleton-forming agent 14 can be fully impregnated, and the effect of the above-mentioned skeleton-forming agent 14 can be fully exhibited. A more preferable bulk density of the conductive auxiliary 15 is 0.04 to 0.15 mg/cm$^3$.

The negative electrode 1 according to the present embodiment contains the binder 16. As the binder 16, organic materials such as polyvinylidene fluoride (PVDF), polytetrafluoroethylene (PTFE), polyimide (PI), polyamide, polyamide-imide, aramid, polyacryl, styrene-butadiene rubber (SBR), an ethylene-vinyl acetate copolymer (EVA), a styrene-ethylene-butylene-styrene copolymer (SEBS), carboxymethylcellulose (CMC), xanthan gum, polyvinyl alcohol (PVA), ethylene vinyl alcohol, polyvinyl butyral (PVB), ethylene vinyl alcohol, polyethylene (PE), polypropylene (PP), polyacrylic acid, poly(lithium acrylate), poly (sodium acrylate), poly(potassium acrylate), poly(ammonium acrylate), poly(methyl acrylate), poly(ethyl acrylate), poly (amine acrylate), polyacrylic ester, epoxy resins, polyethylene terephthalate (PET), polybutylene terephthalate (PBT), nylon, vinyl chloride, silicone rubber, nitrile rubber, cyanoacrylate, urea resins, melamine resins, phenol resins, latex, polyurethane, silylated urethane, nitrocellulose, dextrin, polyvinylpyrrolidone, vinyl acetate, polystyrene, chloropropylene, resorcinol resins, polyaromatic, modified silicone, methacryl resins, polybutene, butyl rubber, 2-propenoic acid, cyanoacrylic acid, methyl methacrylate, glycidyl methacrylate, acryl oligomers, 2-hydroxyethyl acrylate, alginic acid, starch, Japanese lacquer, sucrose, glue, casein, and cellulose nanofiber may be used alone or in combination of two or more.

Mixtures of the above-mentioned various organic binders and inorganic binders may be used. Examples of the inorganic binder include silicate-based binders, phosphate-based binders, sol-based binders, and cement-based binders. For example, inorganic materials such as lithium silicate, sodium silicate, potassium silicate, cesium silicate, guanidine silicate, ammonium silicate, silicofluorides, borates, lithium aluminate, sodium aluminate, potassium aluminate, aluminosilicates, lithium aluminate, sodium aluminate, potassium aluminate, poly aluminum chloride, poly aluminum sulfate, poly aluminum sulfate silicate, aluminum sulfate, aluminum nitrate, ammonium alum, lithium alum, sodium alum, potassium alum, chromium alum, iron alum, manganese alum, ammonium nickel sulfate, diatomite, polyzirconoxane, polytantaloxane, mullite, white carbon, silica sol, colloidal silica, fumed silica, alumina sol, colloidal alumina, fumed alumina, zirconia sol, colloidal zirconia, fumed zirconia, magnesia sol, colloidal magnesia, fumed magnesia, calcia sol, colloidal calcia, and fumed calcia, titania sol, colloidal titania, fumed titania, zeolites, silicoaluminophosphate zeolites, sepiolite, montmorillonite, kaolin, saponite, aluminum phosphate, magnesium phosphate, calcium phosphate, iron phosphate, copper phosphate, zinc phosphate, titanium phosphate, manganese phosphate, barium phosphate, tin phosphate, low melting point glass, mortar, gypsum, magnesium cement, litharge cement, Portland cement, blast furnace cement, fly ash cement, silica cement, phosphate cement, concrete, and solid electrolytes may be used alone or in combination of two or more.

In the present embodiment, the negative electrode active material 13 and the skeleton-forming agent 14 are firmly bound by the above-mentioned interface layer formed using the skeleton-forming agent 14, and therefore all the above-mentioned binders 16 can be used. The content of the binder 16 is preferably 0.1 to 60% by mass based on 100% by mass in total of the negative electrode active material 13, the conductive auxiliary 15, and the binder 16 contained in the negative electrode material 12. With the content of the binder 16 in this range, the ion conductivity can be improved, high mechanical strength is obtained, and excellent cycle life characteristics are obtained without reducing the negative electrode capacity density. The content of the binder 16 is more preferably 0.5 to 30% by mass.

The thickness of the negative electrode 1 of the present embodiment comprising the above configuration is preferably 50 μm to 1000 μm. With the thickness of the negative electrode 1 in this range, durability deterioration can be suppressed, and the energy density can be improved as compared with conventional negative electrodes. A more preferable thickness of the negative electrode 1 is 80 μm to 800 μm.

In the negative electrode 1 of the present embodiment, it is preferable that the distance between the current collector 11 comprising the porous metal body and the negative electrode active material 13 be 50 μm or less. With the distance between the current collector 11 comprising the porous metal body and the negative electrode active material 13 of 50 μm or less, durability deterioration can be suppressed. A more preferable distance between the current collector 11 comprising the porous metal body and the negative electrode active material 13 is 30 μm or less.

[Positive Electrode]

Hereinafter, a positive electrode when a lithium ion secondary battery is constituted using the above-mentioned negative electrode will be described. As long as a positive electrode active material is a positive electrode active material usually used in a lithium ion secondary battery, the positive electrode active material is not particularly limited. For example, positive electrode active materials such as alkali metal transition metal oxide-based positive electrode active materials, vanadium-based positive electrode active materials, sulfur-based positive electrode active materials, solid solution-based positive electrode active materials (a lithium-rich type, a sodium-rich type, and a potassium-rich type), carbon-based positive electrode active materials, and organic matter-based positive electrode active materials are used.

The positive electrode of the present embodiment may contain a skeleton-forming agent in the same way as the above-mentioned negative electrode. The same skeleton-forming agent as in the above-mentioned negative electrode can be used, and a preferable content of the skeleton-forming agent is the same as that of the negative electrode.

The positive electrode of the present embodiment may contain a conductive auxiliary. As the conductive auxiliary, the above-mentioned various conductive auxiliaries which can be used in the negative electrode are used. A preferable content of the conductive auxiliary is also the same as that of the negative electrode.

The positive electrode of the present embodiment may contain a binder. As the binder, organic materials such as polyvinylidene fluoride (PVDF), polytetrafluoroethylene (PTFE), hexafluoropropylene, tetrafluoroethylene, polyacryl, and alginic acid may be used alone or in combination of two or more. The binder may be a mixture of these organic binders and an inorganic binder. Examples of the inorganic binder include silicate-based inorganic binders, phosphate-based inorganic binders, sol-based inorganic binders, and cement-based inorganic binders.

As long as the material of a current collector used for the positive electrode is a material which has electron conductivity, and enables to energize the retained positive electrode active material, the material of the current collector is not particularly limited. Conductive substances such as C, T, Cr, Ni, Ni—Cr alloy, Cu, Mo, Ru, Rh, Ta, W, Os, Ir, Pt, Au, and Al and an alloy containing two or more of these conductive substances (for example, stainless steel or Al—Fe alloy) can be used. When a substance other than the above-mentioned conductive substances is used, the substance may be different type metals such as Fe covered with Al or a multilayer structure of different type elements such as Al covered with C. In view of high electric conductivity and high stability in an electrolytic solution, the current collector is preferably C, Ti, Cr, Au, Al, stainless steel, or the like, and is preferably C, Al, stainless steel, or the like from the viewpoints of oxidation resistance and material cost. The current collector is more preferably Al or Al alloy covered with carbon or stainless steel covered with carbon. Even when the current collector used for the positive electrode comprises a porous metal body, the material of the current collector used for the positive electrode is not limited in the case where the material of the current collector is one of the above-mentioned materials.

The shape of the current collector used for the positive electrode includes linear shapes, rod shapes, plate shapes, foil shapes, and porous shapes. Since the filling density can be increased, and the skeleton-forming agent permeates an active material layer easily, among these, the shape may be a porous shape. Examples of the porous shapes include meshes, woven fabrics, nonwoven fabrics, embossed bodies, punched bodies, expanded bodies, and foamed bodies. The same porous metal body as that of the negative electrode may be used.

[Separator]

In the lithium ion secondary battery of the present embodiment, a separator usually used for a lithium ion secondary battery can be used. For example, a polyethylene fine porous film, a polypropylene fine porous film, a glass nonwoven fabric, an aramid nonwoven fabric, a polyimide fine porous film, a polyolefin fine porous film, or the like can be used as a separator.

[Electrolyte]

In the lithium ion secondary battery of the present embodiment, an electrolyte usually used in a lithium ion secondary battery can be used. Examples include electrolytic solutions in which electrolytes are dissolved in solvents, gel electrolytes, solid electrolytes, ionic liquids, and molten salts. Here, the electrolytic solution refers to an electrolytic solution with an electrolyte dissolved in a solvent.

The electrolyte as the lithium ion secondary battery needs to contain lithium ions as a carrier which conducts electricity. Therefore, as long as the electrolytic salt is used in lithium ion secondary batteries, the electrolytic salt is not particularly limited, and lithium salts are suitable. As this lithium salt, at least one selected from the group consisting of lithium hexafluorophosphate ($LiPF_6$), lithium perchlorate ($LiClO_4$), lithium tetrafluoroborate ($LiBF_4$), lithium trifluoromethanesulfonate ($LiCF_3SO_4$), lithium bis(trifluoromethanesulfonyl)imide ($LiN(SO_2CF_3)_2$), lithium bis (pentafluoroethanesulfonyl)imide ($LiN(SO_2C_2F_5)_2$), lithium bis (oxalato)borate ($LiBC_4O_8$), and the like can be used, or two or more thereof can be used in combination.

As long as the solvent for the electrolyte is used in a lithium ion secondary battery, the solvent is not limited. For example, at least one selected from the group consisting of propylene carbonate (PC), ethylene carbonate (EC), dimethyl carbonate (DMC), diethyl carbonate (DEC), ethyl methyl carbonate (EMC), γ-butyrolactone (GBL), methyl-γ-butyrolactone, dimethoxymethane (DMM), dimethoxyethane (DME), vinylene carbonate (VC), vinyl ethylene carbonate (EVC), fluoroethylene carbonate (FEC), and ethylene sulfite (ES) can be used, or two or more thereof can be used in combination.

Although the concentration of the electrolytic solution (concentration of the salt in the solvent) is not particularly limited, the concentration is preferably 0.1 to 3.0 mol/L, and further preferably 0.8 to 2.0 mol/L.

The ionic liquids and the molten salts are classified into pyridine-based, alicyclic amine-based, and aliphatic amine-based ionic liquids and the molten salts by the type of the cation (positive ion). Various ionic liquids or molten salts can be synthesized by selecting the types of anions (negative ions) combined with these. Examples of the cation include ammonium-based cations such as imidazolium salts and pyridinium salts; phosphonium-based ions; and inorganic ions. Examples of the anion to be adopted include halogen-based anions such as a bromide ion and a triflate; boron-based anions such as tetraphenylborate; and phosphorus-based anions such as hexafluorophosphate.

Ionic liquids and molten salts can be obtained, for example, by well-known synthesis methods in which ionic liquids and molten salts are constituted in combination of cations such as imidazolinium and anions such as $Br^-$, $Cl^-$, $BF^{4-}$, $PF^{6-}$ $(CF_3SO_2)_2N^-$, $CF_3SO^{3-}$, and $FeCl^{4-}$. Even though electrolytes are not added to the ionic liquids and the molten salts, the ionic liquids and the molten salts can function as electrolytic solutions.

The solid electrolytes are classified into sulfide-based, oxide-based, hydride-based, and organic polymer-based solid electrolytes. Many of these are amorphous substances and crystalline substances comprising salts which function as carriers and inorganic derivatives. Since flammable aprotic organic solvents do not need to be used unlike the electrolytic solutions, the gas or the liquid is less likely to be ignited and the liquid is less likely to leak. The battery is expected to be a secondary battery with excellent safety.

[Manufacturing Method]

Hereinafter, a method for manufacturing a lithium ion secondary battery according to the present embodiment will be described. The method for manufacturing a negative electrode for lithium ion secondary batteries according to the present embodiment has a first step of forming a negative electrode layer precursor by applying a negative electrode material containing a negative electrode active material, a conductive auxiliary, and a binder to a current collector and drying the negative electrode material. For example, while a nickel porous material having a thickness of 1000 μm is manufactured to provide the nickel porous body wound in the shape of a roll beforehand, a negative electrode active material, a binder, a conductive auxiliary, and the like, as a negative electrode material, are mixed to prepare pasty slurry. Subsequently, the slurry-like negative electrode material is filled and applied to the nickel porous bodies, dried, and then subjected to pressure control treatment to obtain negative electrode layer precursors. The negative electrode layer precursor may not be subjected to pressure control treatment.

As mentioned above, the negative electrode layer precursors may remain wet without drying. Examples include a method for integrating the negative electrode active material (precursor) by forming a negative electrode active material layer in the porous current collector using chemical plating, sputtering, vapor deposition, gas deposition, dipping, press-fitting, or the like besides the above-mentioned slurry application. However, the slurry application or the dipping is preferable from the viewpoints of the lyophilicity of the skeleton-forming agent and electrode manufacturing cost.

For example, the silicate having siloxane bonds or the phosphate having phosphate bonds is purified by a dry method or wet method, and water is added to this for adjustment to prepare skeleton-forming agent liquid containing a skeleton-forming agent. A surfactant may be mixed at this time. As a technique by the dry method, for example, an alkali metal silicate can be produced by adding $SiO_2$ to water dissolving an alkali metal hydroxide and treating the mixture at 150° C. to 250° C. in an autoclave. As a technique by the wet method, an alkali metal silicate can be produced, for example, by firing a mixture comprising an alkali metal carbonate compound and $SiO_2$ at 1000° C. to 2000° C. and dissolving this in hot water. The method for manufacturing a negative electrode for lithium ion secondary batteries according to the present embodiment has a second step of impregnating a skeleton-forming agent containing a silicate having siloxane bonds or a phosphate having phosphate bonds into the negative electrode layer precursor formed in the first step and drying the impregnated negative electrode layer precursor to form a negative electrode layer. A negative electrode wherein the content of the skeleton-forming agent in the outer portion of the negative electrode in the in-plane direction is higher than the content of the skeleton-forming agent in the inner portion of the negative electrode in the in-plane direction can be manufactured by impregnating the skeleton-forming agent into the whole negative electrode layer precursor formed in the first step once for curing at this time and impregnating the skeleton-forming agent into only the outside in the surface direction again for curing.

Subsequently, the skeleton-forming agent is applied to the whole surface of the negative electrode layer precursor, and the negative electrode layer precursor is coated with the negative electrode active material. The method for applying a skeleton-forming agent can be performed by a method for dropping and applying a skeleton-forming agent to the surfaces of the precursors of negative electrodes, spray coating, screen printing, the curtain method, spin coating, gravure coating, die coating, or the like besides a method for impregnating the precursors of the negative electrodes into the skeleton-forming agent liquid stored in a tank. The skeleton-forming agent applied to the surfaces of the negative electrode layer precursors permeates the negative electrode, and enters spaces or the like in the negative electrode active material and the conductive auxiliary. The negative electrode layer precursor is dried by heat treatment to cure the skeleton-forming agent. Then, the skeleton-forming agent is further applied again to only an outer portion of the negative electrode layer precursor in the in-plane direction. At this time, the inside in the in-plane direction may be subjected to masking treatment with tape or the like. The skeleton-forming agent can form the skeleton of the negative electrode active material layer, and a negative electrode wherein the content of the skeleton-forming agent in the outer portion of the negative electrode in the in-plane direction is higher than the content of the skeleton-forming agent in the inner portion of the negative electrode in the in-plane direction can be moreover manufactured thereby.

If the heat treatment temperature is high, the heat treatment time can be shortened, and the strength of the skeleton-forming agent is improved. Therefore, the above-mentioned drying treatment is performed at preferably 80° C. or more, more preferably 100° C. or more, and desirably 110° C. or more. As long as the current collectors are not molten, the upper limit temperature of the heat treatment is not particularly limited. For example, the temperature may be raised to around 1000° C., which is the melting point of copper. Since binders might be carbonized, or current collectors might be softened in the case of conventional electrodes, the upper limit temperature was estimated to be still lower than 1000° C. Since, in the present embodiment where the skeleton-forming agent is used, the skeleton-forming agent exhibits excellent heat resistance, and is stronger than the current collectors, the upper limit of the temperature is 1000° C.

The drying treatment can be performed by maintaining the temperature for a drying treatment time of 0.5 to 100 hours. Although an atmosphere for heat treatment may be the air atmosphere, the treatment is preferably performed in a non-oxidative atmosphere to prevent the oxidation of the current collectors.

Here, in the method for manufacturing a negative electrode for lithium ion secondary batteries of the present embodiment, B/A, which is the ratio of the density B of the whole negative electrode layer formed in the second step to the density A of the whole negative electrode layer precursor formed in the first step, is controlled to 0.9<B/A<1.4. B/A, which is the ratio of the density B of the whole negative electrode layer to the density A of the whole negative electrode layer precursor (namely the density increase ratio) is specifically controlled to the above-mentioned range by selecting the material types, the amounts of the materials, the treatment conditions, and the like. The impregnated skeleton-forming agent spreads into the negative electrode layers thereby, so that the skeleton-forming agent is disposed also on the interface with the current collectors in the negative electrode layers. Therefore, high mechanical strength is obtained, and the cycle life characteristics are improved due to skeleton formation by the skeleton-forming agent uniformly disposed in the whole negative electrode layer.

In the method for manufacturing the negative electrode of the lithium ion secondary battery of the present embodiment, the density A of the whole negative electrode layer precursor formed at the first step is 0.5 to 2.0 g/cm$^3$. B/A, which is the ratio of the density B of the whole negative electrode layer to the density A of the negative electrode layer precursor (namely the density increase ratio) can be adjusted to the above-mentioned range more certainly thereby, and the effect of the above-mentioned skeleton-forming agent is enhanced. A more preferable range of the density A of the whole negative electrode layer precursor is 0.6 to 1.5 g/cm$^3$. When the density A of the negative electrode layer precursor is 0.6 g/cm$^3$ or more, a decrease in energy density due to a decrease in electrode density can be suppressed. When the density A is 1.5 g/cm$^3$ or less, a decrease in capacity can be suppressed.

The method for manufacturing a positive electrode of lithium ion secondary batteries of the present invention has a step of applying a positive electrode material containing a positive electrode active material, a conductive auxiliary, and a binder to a current collector and drying and rolling the positive electrode material to manufacture a positive electrode. For example, while aluminum foil having a thickness of 10 μm is manufactured to provide the aluminum foil wound in the shape of a roll beforehand, a positive electrode active material, a binder, a conductive auxiliary, and the like, as a positive electrode material, are mixed to prepare pasty slurry. Subsequently, the slurry-like positive electrode material is applied to the surface of aluminum, dried, and then treated in a rolling press step to obtain a positive electrode. A foamed porous body comprising a metal may be used as the current collector. It is characteristic that this current collector is filled with the electrode mixture. Although the method for filling a current collector with an electrode mixture is not particularly limited, examples include a method for filling the slurry containing the electrode mixture into the mesh structure of the current collector under pressure by the press-fitting. After the electrode mixture is filled, the filled current collector is dried and then pressed, and the density of the electrode mixture can be improved, and can be adjusted to a desired density.

Finally, a lithium ion secondary battery can be obtained by cutting the obtained negative electrode and positive electrode to desired sizes, joining the negative electrode and the positive electrode through a separator, and sealing the negative electrode and the positive electrode with the negative electrode and the positive electrode immersed in an electrolytic solution. The structure of the lithium ion secondary battery can be applied to existing battery forms and structures such as laminated batteries and wound batteries.

[Effect]

According to the first embodiment of the nonaqueous electrolyte secondary battery of the present invention, the following effects are produced. In the first embodiment, the nonaqueous electrolyte secondary battery 3 comprising the positive electrode 2 and the negative electrode 1 has the current collector 11 comprising the porous metal body and the negative electrode material 12 disposed in pores of the porous metal body. The negative electrode 1 is configured so that the negative electrode material 12 contains the negative electrode active material 13 comprising the silicon-based material, the skeleton-forming agent 14 containing the silicate having siloxane bonds, the conductive auxiliary 15, and the binder 16, and the content of the skeleton-forming agent 14 in the outer portion of the negative electrode 1 in the in-plane direction is higher than the content of the skeleton-forming agent 14 in the inner portion of the negative electrode 1 in the in-plane direction.

First, the porous metal skeleton enables to fix the negative electrode material 12 in micron size regions and suppress exfoliation and cracks of the negative electrode using the porous metal body as the current collectors 11. The negative electrode material 12 can be fixed in nano size regions using the skeleton-forming agent 14 as the negative electrode material 12. More specifically, a third phase is formed with the skeleton-forming agent 14 on the interface between the current collector 11 comprising the porous metal body and the negative electrode active material 13, and the negative electrode active material 13 is firmly bound in the negative electrode material 12, and the falling can be suppressed at the time of expansion and contraction, and durability deterioration can be suppressed thereby. When the content of the skeleton-forming agent 14 in the outer portion of the negative electrode 1 in the in-plane direction is higher than the content of the skeleton-forming agent 14 in the inner portion of the negative electrode 1 in the in-plane direction, unintended deformation or positional difference of the negative electrode which occurs from the inside in the in-plane direction of the negative electrode toward the outside in the in-plane direction at the time of expansion and contraction can moreover be suppressed. Therefore, although the negative electrode active material 13 comprising a silicon-based material, which has high capacity and a very high coefficient of expansion and contraction, is used, unintended deformation or positional difference of the negative electrode can be suppressed with multiple skeleton structure formed by filling the negative electrode material 12 containing such a skeleton-forming agent 14 into the foamed metal body even at the time of the full charge and discharge cycle, in which the SOC is 0 to 100. The negative electrode structure can therefore be maintained. An increase in capacity due to the thickening of the film of the negative electrode, and falling and the rupture of conductive paths at the time of high weight per unit area can be suppressed by extension. High cycle performance can be achieved, and overwhelming high energy density can be achieved.

The present invention is not limited to the above-mentioned embodiment. As long as an object of the present invention can be achieved, modification and improvement are included in the present invention. For example, a nonaqueous electrolyte secondary battery is a secondary battery (power storage device) using a nonaqueous electrolyte such as an organic solvent for the electrolyte, and nonaqueous electrolyte secondary batteries include sodium ion secondary batteries, potassium ion secondary batteries, magnesium ion secondary batteries, and calcium ion secondary batteries besides lithium ion secondary batteries. A lithium ion secondary battery means a secondary battery of a nonaqueous electrolyte, which does not contain water as the main ingredient, wherein lithium ions are contained in a carrier, which conducts electricity. For example, lithium ion secondary batteries, metallic lithium batteries, lithium polymer batteries, all-solid lithium batteries, air lithium ion batteries, and the like correspond. Other secondary batteries are also the same. Here, the nonaqueous electrolyte, which does not contain water as the main ingredient, means that the main component in the electrolyte is not water. That is, the nonaqueous electrolyte, which does not contain water as the main ingredient, is a well-known electrolyte used for nonaqueous electrolyte secondary batteries. Even though this electrolyte contains a little water, this electrolyte can function as a secondary battery. However, since water have adverse influence on the cycle characteristics, the storage characteristics, and the input and output characteristics of the secondary battery, it is desirable that this electrolyte be an electrolyte containing water as little as possible. Practically, water in the electrolyte is preferably at 5000 ppm or less.

Second Embodiment

[Positive Electrode]

Hereinafter, an aspect which is a positive electrode constituted as a nonaqueous electrolyte secondary battery in combination with the negative electrode of the first embodiment, and has a buffer layer which is more easily deformable by external force as compared with other regions of the positive electrode in a region of the positive electrode opposed to the negative electrode (hereinafter also called a second embodiment) will be described in detail with reference to the drawing as yet another embodiment of the present invention.

[Buffer Layer]

Figure 3:
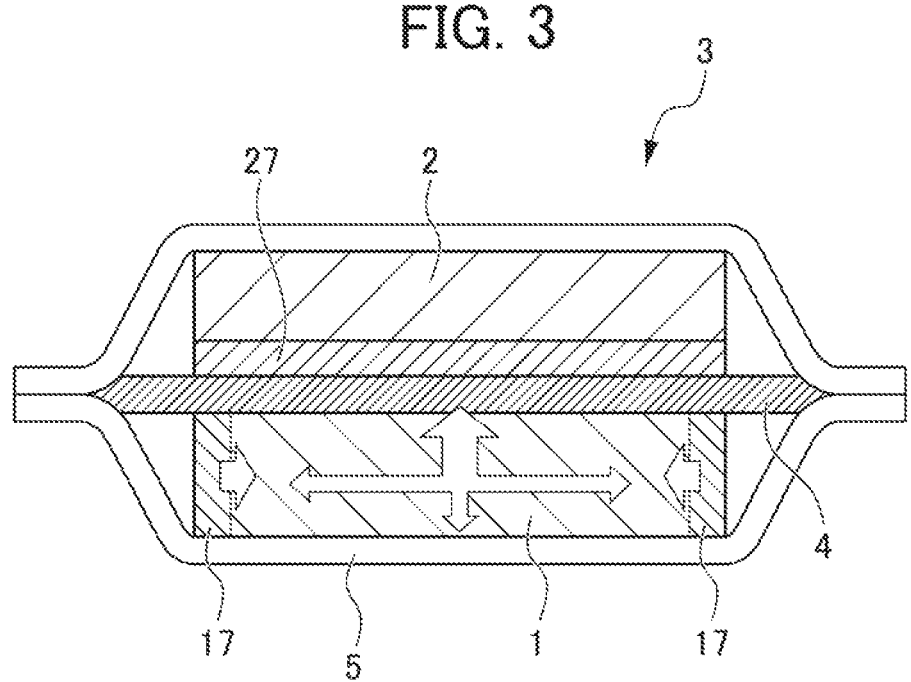
FIG. 3 is a sectional view showing the configuration of a nonaqueous electrolyte secondary battery according to a second embodiment of the present invention schematically.

FIG. 3 is a figure showing the configuration of the nonaqueous electrolyte secondary battery according to the second embodiment schematically. The positive electrode 2 of the nonaqueous electrolyte secondary battery has a buffer layer 27 which is more easily deformable by external force as compared with other regions of the positive electrode in the region opposed to the negative electrode 1. For example, when the present embodiment is applied to a lithium ion secondary battery, a lithium ion secondary battery which enables to suppress durability deterioration, improve energy density, and further suppress a decrease in the function of the nonaqueous electrolyte secondary battery cell by further suppressing or absorbing unintended deformation of the negative electrode or difference in positional relationship between the negative electrode and the positive electrode with the buffer layer can be provided. The battery will be described in detail hereinafter. However, as long as the battery does not deviate from the gist of the present invention, various types of addition, modification, or deletion is possible.

The buffer layer 27 has the property of following the expansion of the negative electrode 1 to be compressed and returning to the original form due to the contraction of the negative electrode 1. The material of the buffer layer preferably contains at least any one of a carbon-based material and an organic conductive polymer. When the carbon-based material is used for the buffer layer, a substance having a high bulk density like conductive furnace carbon is preferable. When the organic conductive polymer is used for the buffer layer, it is preferable that the organic conductive polymer be an elastomer or a resin having Li conductivity. The thickness of the buffer layer is preferably 10 µm or less from the viewpoint that the thickness does not influence a decrease in the energy density of the nonaqueous electrolyte secondary battery. A more preferable thickness of the buffer layer is 5 µm.

[Method for Manufacturing Positive Electrode Having Buffer Layer]

A method for manufacturing the positive electrode of a lithium ion secondary battery according to the second embodiment has a step of applying a mixture containing at least any one of a carbon-based material or an organic conductive polymer to the positive electrode obtained by the step described in the above-mentioned first embodiment and drying the mixture to provide a buffer layer on the positive electrode. For example, the buffer layer can be provided on the positive electrode layer by applying the slurry containing at least any one of a carbon-based material and an organic conductive polymer to the positive electrode layer and drying the slurry.

[Effect]

According to the second embodiment of the present invention, the following effects are produced. In the present embodiment, the nonaqueous electrolyte secondary battery is configured to have the buffer layer 27 which is easily deformable as compared with other regions of the positive electrode in the region of the positive electrode 2 opposed to the negative electrode in the positive electrode besides the negative electrode of the first embodiment.

When the positive electrode 2 has the buffer layer 27 which is more easily deformable than other regions of the positive electrode in the region of the positive electrode 2 opposed to the negative electrode, the buffer layer 27 can also follow the expansion and contraction of the negative electrode which occur from the negative electrode toward the positive electrode direction besides unintended deformation or positional difference of the negative electrode which occurs from the inside in the in-plane direction of the negative electrode toward the outside in the in-plane direction at the time of charge and discharge. Unintended deformation or positional difference of the negative electrode can be further suppressed or absorbed. Therefore, although the negative electrode active material 13 comprises the silicon-based material, which high capacity and a very high coefficient of expansion and contraction, is used in the negative electrode, unintended deformation or positional difference of the negative electrode which occurs from the negative electrode in the positive electrode direction can also be suppressed or absorbed effectively besides unintended deformation or positional difference of the negative electrode which occurs from the inside in the in-plane direction of the negative electrode toward the outside in the in-plane direction by the structure having the buffer layer 27 which is more easily deformable than other regions of the positive electrode in the region of the positive electrode 2 opposed to the negative electrode even in the case where the full charge and discharge cycle, in which the SOC is 0 to 100, is performed. Therefore, the negative electrode structure can be maintained. An increase in capacity due to the thickening of the film of the negative electrode or falling and the rupture of conductive paths at the time of a high weight per unit area can be further suppressed, high cycle performance can be achieved, and a more overwhelming high energy density can be achieved by extension.

Third Embodiment

As yet another embodiment of the nonaqueous electrolyte secondary battery of the present invention, an aspect also having a non-deforming layer which is less easily deformable by external force as compared with other regions of a negative electrode in a region of the negative electrode opposed to a positive electrode (hereinafter also called a third embodiment) will also be described in detail with reference to the drawing.

[Non-Deforming Layer]

Figure 4:
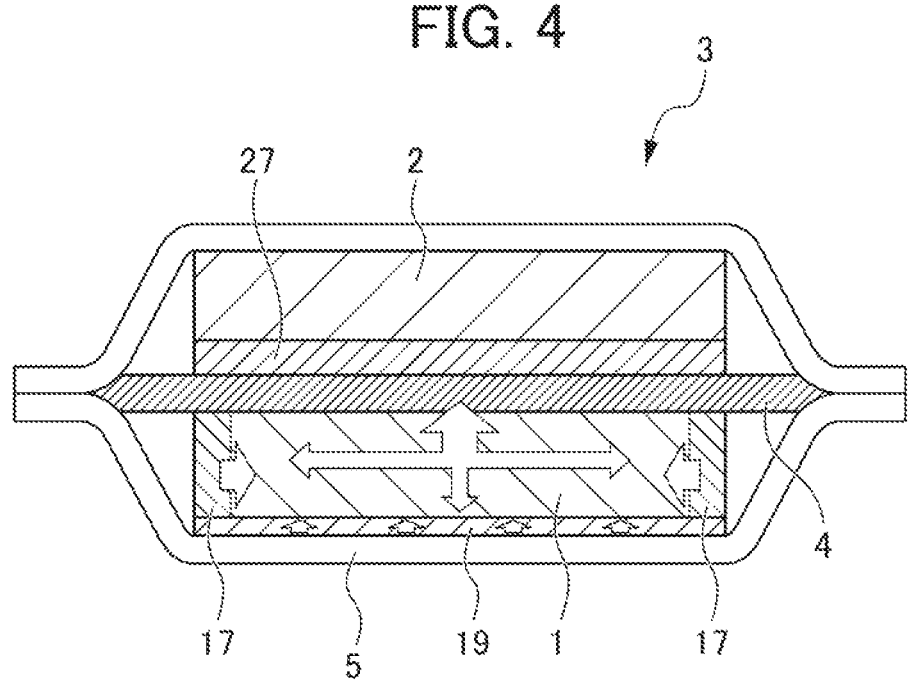
FIG. 4 is a sectional view showing the configuration of a nonaqueous electrolyte secondary battery according to a third embodiment of the present invention schematically.

FIG. 4 is a sectional view showing the configuration of a nonaqueous electrolyte secondary battery according to the third embodiment schematically. A negative electrode 1 of a nonaqueous electrolyte secondary battery according to the present embodiment has a non-deforming layer 19 which is less easily deformable by external force as compared with other regions of the negative electrode in a region of the negative electrode 1 opposed to a positive electrode in addition to the configuration of the first embodiment. In the present embodiment, the nonaqueous electrolyte secondary battery may further have the above-mentioned buffer layer 27 in the positive electrode. For example, a lithium ion secondary battery which enables to suppress durability deterioration, improve energy density, and further suppress a decrease in the function of the nonaqueous electrolyte secondary battery cell by further suppressing unintended deformation or difference in positional relationship between the negative electrode and the positive electrode can be provided by applying the present embodiment to a lithium ion secondary battery. An example in which the present embodiment is applied to a lithium ion secondary battery will also be described in detail hereinafter. As long as the lithium ion secondary battery does not deviate from the gist of the present invention, various types of addition, modification, or deletion is possible.

An electrode active material which does not or hardly expands or contracts accompanying charge and discharge can be used for the non-deforming layer 19. Examples of such an electrode active agent include a carbon-based material and lithium titanate (LTO). When the carbon-based material is used, it is preferable to use hard carbon. As long as the non-deforming layer does not influence the energy density of the nonaqueous electrolyte secondary battery, the coating amount of the non-deforming layer may be set, and the coating amount is preferably 7 mg/cm$^2$ or less. A further preferable coating amount of the non-deforming layer is 2.5 mg/cm$^2$. The thickness of the non-deforming layer is preferably 15 μm or less from the viewpoint of energy density. A further preferable thickness is 10 μm or less. The configuration of the first embodiment can be preferably used for other configurations of the negative electrode in the present embodiment.

[Method for Manufacturing Negative Electrode Having Non-Deforming Layer]

The method for manufacturing a negative electrode of a lithium ion secondary battery according to the third embodiment has a third step of further providing a non-deforming layer in the negative electrode formed in the second step of the first embodiment. For example, the non-deforming layer can be provided on the negative electrode layer by applying slurry containing an electrode active material which does not or hardly expands and contracts due to charge and discharge to a negative electrode layer and drying the coated negative electrode. Examples include a method for integrating the non-deforming layer with the negative electrode layer by disposing the electrode active material (precursor) using chemical plating, sputtering, vapor deposition, gas deposition, dipping, or the like besides the above-mentioned slurry application to form an electrode active material layer on a negative electrode layer.

[Effect]

According to the third embodiment, the following effects are produced. In the third embodiment, the nonaqueous electrolyte secondary battery is configured to have a non-deforming layer 19 which is less easily deformable by external force as compared with other regions of the negative electrode in the region of the negative electrode 1 opposed to the positive electrode in addition to the configuration of the negative electrode of the first embodiment.

When the nonaqueous electrolyte secondary battery has the non-deforming layer 19 which is less easily deformable by external force as compared with other regions of the negative electrode in the region of the negative electrode 1 opposed to the positive electrode, unintended deformation or positional difference of the negative electrode which occurs from the inside in the surface direction of the negative electrode in the direction to the non-deforming layer can also be suppressed besides unintended deformation or positional difference of the negative electrode which occurs from the inside in the in-plane direction of the negative electrode toward the outside in the in-plane direction. Therefore, although the negative electrode active material 13 comprising the silicon-based material, which has high capacity and a very high coefficient of expansion and contraction, is used in the negative electrode, unintended deformation or positional difference of the negative electrode which occurs from the inside in the surface direction of the negative electrode in the direction to the non-deforming layer can also be suppressed besides unintended deformation or positional difference of the negative electrode which occurs from the inside in the in-plane direction of the negative electrode toward the outside in the in-plane direction by the structure having the non-deforming layer 19 which is less easily deformable by external force as compared with other regions of the negative electrode in the region of the negative electrode 1 opposed to the positive electrode even in the case where the full charge and discharge cycle, in which the SOC is 0 to 100, is performed. Therefore, the negative electrode structure can be maintained. An increase in capacity due to the thickening of the film of the negative electrode or falling and the rupture of conductive paths at the time of a high weight per unit area can be further suppressed, high cycle performance can be achieved, and a more overwhelming high energy density can be achieved by extension.

According to an embodiment having the above-mentioned buffer layer 27 in the positive electrode in addition to the configuration having the above-mentioned non-deforming layer 19, the following effects are produced. When the battery has a buffer layer 27 which is more easily deformable than other regions of the positive electrode in the region of the positive electrode 2 opposed to the negative electrode, and has the non-deforming layer 19 which is less easily deformable by external force as compared with other regions of the negative electrode in the region of negative electrode 1 opposed to the positive electrode, the battery can follow the expansion and contraction of the negative electrode which occur from the inside in the in-plane direction of the negative electrode toward the outside in the in-plane direction and which occur in the direction of the positive electrode and the direction of the non-deforming layer at the time of charge and discharge, and can further suppress or absorb unintended deformation or positional difference of the negative electrode. Therefore, although the negative electrode active material 13 comprising the silicon-based material, which has high capacity and a very high coefficient of expansion and contraction, is used in the negative electrode, unintended deformation or positional difference of the negative electrode which occur from the inside in the in-plane direction of the negative electrode toward the outside in the in-plane direction and which occur in the direction of the positive electrode and the direction of the non-deforming layer can be further suppressed or absorbed by the structure having the buffer layer 27 which is more easily deformable than other regions of the positive electrode in the region of the positive electrode 2 opposed to the negative electrode and having the non-deforming layer 19 which is less easily deformable by external force as compared with other regions of the negative electrode in the region of negative electrode 1 opposed to the positive electrode even in the case where the full charge and discharge cycle, in which the SOC is 0 to 100, is performed. Therefore, the negative electrode structure can be maintained. An increase in capacity due to the thickening of the film of the negative electrode, or falling and the rupture of conductive paths at the time of a high weight per unit area can be further suppressed, high cycle performance can be achieved, and a further overwhelming high energy density can be achieved by extension.

EXAMPLES

Next, although the Examples of the present invention will be described, the present invention is not limited to these Examples.

Example 1

[Manufacturing of Negative Electrode]

Slurry containing silicon (average particle size: 1 to 10 μm) as a negative electrode active material, acetylene black as a conductive auxiliary, and polyvinylidene fluoride (PVDF) as a binder was prepared. Subsequently, the prepared slurry was filled into "nickel CELMET"® manufactured by Sumitomo Electric Industries, Ltd. as current collectors and dried to obtain negative electrode layer precursors.

Meanwhile, an aqueous 10% by mass solution of $Na_2O.3SiO_2$ was prepared as skeleton-forming agent liquid containing a skeleton-forming agent and water. The negative electrode layer precursors obtained above were immersed in the prepared skeleton-forming agent liquid. After the immersion, the precursors of negative electrodes were heated at 160° C. and dried to obtain negative electrodes in which negative electrode layers were formed (a first step).

Next, the front surface and the rear surface of the negative electrode obtained in the first step were masked with a chemical-resistant tape while outer portions of the surfaces extending over a length of 10% of each of the length and width of the electrode were left unmasked. The above-mentioned negative electrodes were immersed in an aqueous 10% by mass solution of $Na_2O.3SiO_2$, heated, and dried at 160° C. to obtain negative electrodes of a first aspect (a second step).

[Manufacturing of Positive Electrode]

As a positive electrode active material, $LiNi_{0.5}Co_{0.2}Mn_{0.3}O_2$ (particle size: 5 to 15 μm) was provided. Then, 94% by mass of the positive electrode active material, 4% by mass of carbon black as a conductive auxiliary, and 2% by mass of polyvinylidene fluorides (PVDF) as a binder were mixed. The obtained mixture was dispersed in a suitable amount of N-methyl-2-pyrrolidone (NMP) to produce positive electrode mixture slurry. As current collectors, foamed aluminum having a thickness of 1.0 mm, a porosity of 95%, a cell number of 46 to 50 cells/inch, a pore size of 0.5 mm, and a specific surface area of 5000 $m^2/m^3$ was provided. The produced positive electrode mixture slurry was applied to the current collectors by press-fitting so that the coating amount was 90 mg/cm². The coated current collectors were dried in vacuum at 120° C. for 12 hours and roll-pressed at a pressure of 15 ton to manufacture positive electrodes for lithium ion secondary batteries in which the electrode mixture was filled into pores of the foamed aluminum.

[Manufacturing of Lithium Ion Secondary Battery]

As separators, a fine porous film which was a three-layer layered body of polypropylene/polyethylene/polypropylene having a thickness of 25 μm was provided and punched out in a size of 100 mm in length×90 mm in width. The positive electrodes for lithium ion secondary batteries and the negative electrodes for lithium ion secondary batteries obtained above were stacked in order of positive electrode/separator/negative electrode/separator/positive electrode/negative electrode to manufacture an electrode laminated body.

Then, tab leads were joined to the current collecting regions of the electrodes by ultrasonic welding. The electrode laminated body weld-joined to the tab leads was inserted into an aluminum laminate for secondary batteries heat-sealed and processed in the shape of a bag to manufacture a laminate cell. As an electrolytic solution, a solution in which 1.2 mol of $LiPF_6$ was dissolved in a solvent obtained by mixing ethylene carbonate, dimethyl carbonate, and ethyl methyl carbonate at a volume ratio of 3:4:3 was provided and poured into the above-mentioned laminate cell to manufacture a lithium ion secondary battery.

Comparative Example 1

A lithium ion secondary battery was manufactured in the same way as in Example 1 except that the skeleton-forming agent was not used at the time of manufacturing the negative electrodes.

Comparative Example 2

A lithium ion secondary battery was manufactured in the same way as in Example 1 except that the second step was not performed at the time of manufacturing the negative electrodes.

Example 2

[Manufacturing of Negative Electrode]
[Manufacturing of Positive Electrode]

As a positive electrode active material, $LiNi_{0.5}Co_{0.2}Mn_{0.3}O_2$ (particle size: 5 to 15 μm) was provided. Then, 94% by mass of the positive electrode active material, 4% by mass of carbon black as a conductive auxiliary, and 2% by mass of polyvinylidene fluorides (PVDF) as a binder were mixed. The obtained mixture was dispersed in a suitable amount of N-methyl-2-pyrrolidone (NMP) to produce positive electrode mixture slurry. As current collectors, foamed aluminum having a thickness of 1.0 mm, a porosity of 95%, a cell number of 46 to 50 cells/inch, a pore size of 0.5 mm, and a specific surface area of 5000 $m^2/m^3$ was provided. The produced positive electrode mixture slurry was applied to the current collectors by press-fitting so that the coating amount was 90 $mg/cm^2$. The coated current collectors were dried at 120° C. for 1 hour to manufacture positive electrode layers. Next, one surface of each of the manufactured positive electrode layers was coated with a 20% by mass solution of furnace black by blade coating. The coated positive electrode layers were dried in vacuum at 120° C. for 1 hour. Subsequently, the dried positive electrode layers were roll-pressed at a pressure of 15 tons to manufacture positive electrodes for lithium-ion batteries having buffer layers. The manufactured positive electrode layer had a thickness of 350 μm, and the buffer layer had a thickness of 5 μm.

[Manufacturing of Lithium Ion Secondary Battery]

A lithium ion secondary battery was manufactured in the same way as in Example 1.

Example 3

[Manufacturing of Negative Electrode]

Slurry containing silicon (average particle size: 1 to 10 μm) as a negative electrode active material, acetylene black as a conductive auxiliary, and polyvinylidene fluoride (PVDF) as a binder was prepared. Subsequently, the prepared slurry was filled into "nickel CELMET"® manufactured by Sumitomo Electric Industries, Ltd. as current collectors and dried to obtain negative electrode layer precursors.

Meanwhile, an aqueous 10% by mass solution of $Na_2O.3SiO_2$ was prepared as skeleton-forming agent liquid containing a skeleton-forming agent and water. The negative electrode layer precursors obtained above were immersed in the prepared skeleton-forming agent liquid. After the immersion, the precursors of negative electrodes were heated at 160° C. and dried to obtain negative electrodes in which negative electrode layers were formed (a first step).

Next, the front surface and the rear surface of the negative electrode obtained in the first step were masked while outer portions of the surfaces extending over a length of 10% of each of the length and width of the electrode were left unmasked. The above-mentioned negative electrodes were immersed in an aqueous 10% by mass solution of $Na_2O.3SiO_2$, heated, and dried at 160° C. to obtain negative electrodes of a first aspect (a second step).

Hard carbon was used as the active material of a non-deforming layer. Then, 96% by mass of hard carbon and 4% by mass of polyvinylidene fluorides (PVdF) as a binder were mixed, and the obtained mixture was dispersed in a suitable amount of N-methyl-2-pyrrolidone (NMP) to produce hard carbon slurry. Next, one surface of each of the manufactured negative electrodes was coated with the hard carbon slurry by blade coating. The coated positive electrode layers were dried in vacuum at 120° C. for 1 hour. Subsequently, the coated negative electrodes were roll-pressed at a pressure of 1 ton to manufacture negative electrodes for lithium ion secondary batteries having non-deforming layers. The manufactured positive electrode layers had a thickness of 500 μm, and the buffer layers had a thickness of 10 μm.

[Manufacturing of Lithium Ion Secondary Battery]

A lithium ion secondary battery was manufactured in the same way as in Example 1.

<Evaluation>
[Durability Test]

A cycle life test was performed on the lithium ion secondary batteries according to the Examples and the Comparative Examples. The cycle life test was performed at a test environmental temperature of 25° C., a current density of 0.2 C-rate, and a cutoff potential of 2.5 to 4.2 V.

Figure 6:
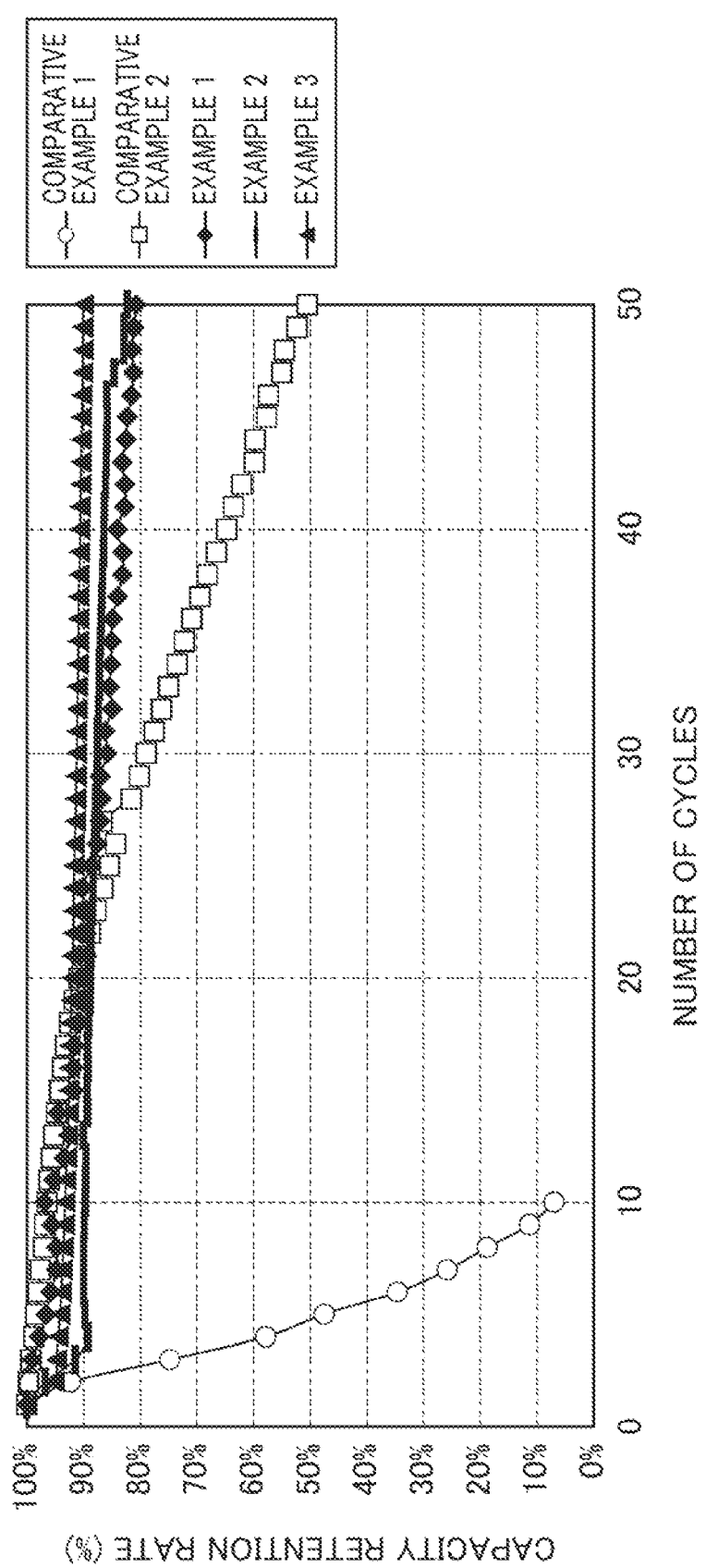
FIG. 6 is a figure showing the relationship between the number of cycles and the capacity retention rates of the Examples and the Comparative Examples.

FIG. 6 is a figure showing the relationship between the number of cycles and the capacity retention rates of the Examples and the Comparative Examples. The capacity retention rates were calculated as the ratios of the discharge capacities after cycle tests to the initial discharge capacities (mAh/g). A result in which, in the lithium ion secondary batteries according to the Examples, decrease in the capacity retention rate is suppressed as compared with the lithium ion secondary batteries according to the Comparative Examples is clear. Accordingly, it was confirmed that a negative electrode for nonaqueous electrolyte secondary batteries which enables to suppress durability deterioration and improve energy density and a nonaqueous electrolyte secondary battery comprising the same are obtained.

EXPLANATION OF REFERENCE NUMERALS

1: Negative electrode
2: Positive electrode
3: Nonaqueous electrolyte secondary battery
4: Separator
5: Exterior body
11 and 21: Current collector
12: Negative electrode material
22: Positive electrode material
13: Negative electrode active material
14: Skeleton-forming agent
15: Conductive auxiliary
16: Binder
17: Outer portion of negative electrode in in-plane direction
18: Inner portion of negative electrode in in-plane direction
19: Non-deforming layer (Active material layer)
27: Buffer layer

What is claimed is:

1. A nonaqueous electrolyte secondary battery, comprising: a positive electrode; and a negative electrode,
the negative electrode comprising: a current collector comprising a porous metal body; and a negative electrode material disposed in pores of the porous metal body,
the negative electrode material comprising: a negative electrode active material comprising a silicon-based material; a skeleton-forming agent comprising a silicate having a siloxane bond; a conductive auxiliary; and a binder,
the negative electrode having an outer portion and an inner portion in an in-plane direction, the outer portion having a skeleton-forming agent content higher than that of the inner portion,
wherein the positive electrode has a buffer layer which is more easily deformable by external force as compared with other regions of the positive electrode in a region opposed to the negative electrode, and
wherein the negative electrode has a non-deforming layer which is less easily deformable by external force as compared with other regions of the negative electrode in a region opposed to the positive electrode.

2. The nonaqueous electrolyte secondary battery according to claim 1, wherein the buffer layer comprises at least one of a carbon-based material and an organic conductive polymer.

3. The nonaqueous electrolyte secondary battery according to claim 1, wherein the non-deforming layer is an active material layer comprising at least one of a carbon-based material and lithium titanate.

4. The nonaqueous electrolyte secondary battery according to claim 1, wherein the skeleton-forming agent comprises a silicate represented by the following general formula (1):

[Chem. 1]

$$A_2O \cdot nSiO_2 \qquad \text{formula (1)}$$

wherein A represents an alkali metal and n is 1.6 or more and 3.9 or less.

5. The nonaqueous electrolyte secondary battery according to claim 1, wherein the porous metal body is a foamed metal body.

* * * * *